(12) United States Patent
Arya et al.

(10) Patent No.: US 9,691,112 B2
(45) Date of Patent: Jun. 27, 2017

(54) GRID-FRIENDLY DATA CENTER

(71) Applicants: International Business Machines Corporation, Armonk, NY (US); Universiti Brunei Darussalam, Brunei Darussalam (BN)

(72) Inventors: Vijay Arya, Bangalore (IN); Tanuja Hrishikesh Ganu, Bangalore (IN); Saiful A. Husain, Brunei (BN); Shivkumar Kalyanaraman, Bangalore (IN); Ashkok Pon Kumar, Bangalore (IN); Swarna Latha Mylavarapu, Bangalore (IN); Devasenapathi Periagraharam Seetharamakrishnan, Bangalore (IN); Liyanage Chandratilak De Silva, Negara (BN)

(73) Assignees: International Business Machines Corporation, Armonk, NY (US); Universiti Brunei Darussalam, Brunei, Darussalam ( * ) Notice: Subject to any disclaimer, the term of this patent is extended or adjusted under 35 U.S.C. 154(b) by 952 days.

(21) Appl. No.: 13/907,084

(22) Filed: May 31, 2013

(65) Prior Publication Data
US 2014/0358309 A1 Dec. 4, 2014

(51) Int. Cl.
*G05F 1/66* (2006.01)
*G05B 15/02* (2006.01)
(Continued)

(52) U.S. Cl.
CPC .............. *G06Q 50/06* (2013.01); *G06Q 10/04* (2013.01); *G06Q 30/0202* (2013.01)

(58) Field of Classification Search
USPC .......................................................... 700/295
See application file for complete search history.

(56) References Cited

U.S. PATENT DOCUMENTS 7,788,516 B2 * 8/2010 Conroy ..................... G06F 1/26
713/300
8,200,370 B2 6/2012 Paik
(Continued)

FOREIGN PATENT DOCUMENTS

WO WO2011146731 A2 11/2011

OTHER PUBLICATIONS

Goiri et al, "Parasol and GreenSwitch: Managing Datacenters Powered by Renewable Energy", Mar. 2013, pp. 13.*
(Continued)

*Primary Examiner* — Miranda Huang
*Assistant Examiner* — Olvin Lopez Alvarez
(74) *Attorney, Agent, or Firm* — Ference & Associates LLC

(57) ABSTRACT

Methods and arrangements for calculating a power budget. Data are received, the data including data relating to a current state of an electrical grid at a power-drawing location which draws at least one variable electrical load, the at least one variable electrical load being subject to variable pricing. At least one prediction is determined, the at least one prediction pertaining to a future state of the electrical grid and a future electrical load to be drawn at the power-drawing location. A power budget is thereupon calculated, with respect to the power-drawing location, based on the data and the at least one prediction. Other variants and embodiments are broadly contemplated herein.

20 Claims, 4 Drawing Sheets

(51) Int. Cl.
*G06Q 30/02* (2012.01)
*G06Q 50/06* (2012.01)
*G06Q 10/04* (2012.01)

(56) References Cited

U.S. PATENT DOCUMENTS

| | | | |
|---|---|---|---|
| 8,276,008 B2 | 9/2012 | Jackson | |
| 8,447,993 B2* | 5/2013 | Greene | G06Q 10/00 700/291 |
| 2006/0206240 A1* | 9/2006 | Tsui | H02J 3/008 700/291 |
| 2006/0276938 A1* | 12/2006 | Miller | G06Q 50/06 700/295 |
| 2010/0057625 A1 | 3/2010 | Boss et al. | |
| 2010/0292976 A1* | 11/2010 | Newcombe | G06F 17/5004 703/13 |
| 2011/0046806 A1* | 2/2011 | Nagel | H04L 67/125 700/291 |
| 2011/0077795 A1* | 3/2011 | VanGilder | G06F 1/206 700/300 |
| 2011/0093127 A1* | 4/2011 | Kaplan | G06Q 10/04 700/292 |
| 2011/0190951 A1* | 8/2011 | Lee | G05D 23/19 700/291 |
| 2011/0316337 A1* | 12/2011 | Pelio | H05K 7/1492 307/24 |
| 2012/0084580 A1* | 4/2012 | Harchol-Balter | G06F 1/3203 713/310 |
| 2012/0173477 A1* | 7/2012 | Coutts | G06F 17/30306 707/602 |
| 2012/0226922 A1* | 9/2012 | Wang | G06F 1/3203 713/320 |
| 2012/0278503 A1 | 11/2012 | DeCusatis et al. | |
| 2012/0326503 A1* | 12/2012 | Birkelund | G06Q 10/04 307/24 |
| 2013/0054987 A1* | 2/2013 | Pfeiffer | G06F 1/305 713/300 |
| 2013/0086404 A1* | 4/2013 | Sankar | G06F 1/305 713/324 |

OTHER PUBLICATIONS

Le et al, "Cost and Energy-Aware Load Distribution Across Data Centers", Oct. 10, 2009, pp. 5.*
Liu, Zhenhua et al., "Data Center Demand Response: Avoiding the Coincident Peak via Workload Shifting and Local Generation," Paper to be presented at SIGMETRICS'13, Pittsburgh, Pennsylvania, USA, Jun. 17-21, 2013, 2 pages, ACM Digital Library.
Parker, James et al., "Tackling Today's Data Center Energy Efficiency Challenges—A Software-Oriented Approach," Schneider Electric, 2007, 17 pages, www.criticalpowernow.com.
Wang, Rui et al., "Data Centers as Demand Response Resources in the Electricity Market: Some Preliminary Results," Feedback Computing'12, San Jose, California, USA, Sep. 17, 2012, 6 pages.
Ghatikar, G. et al., "Demand Response and Open Automated Demand Response Opportunities for Data Centers," Ernest Orlando Lawrence Berkeley National Laboratory, Jan. 2010, 94 pages, California Energy Commission, PIER Program and Pacific Gas and Electric Company, San Francisco, California, USA.
Spees, Kathleen, Meeting Electric Peak on the Demand Side: Wholesale and Retail Market Impacts of Real-Time Pricing and Peak Load Management Policy, Doctoral Thesis, Carnegie Mellon University, Sep. 2008, CABA (Continental Automated Buildings Association) Information Series, http://www.caba.org.
Verma, Akshat et al., BrownMap: Enforcing Power Budget in Shared Data Centers, IBM Research Report, Dec. 17, 2009, 15 pages, IBM Research Lab, New Delhi, India.

* cited by examiner

| p(t) | g(t) | gs(t) | Action |
|---|---|---|---|
| High (1) | Over loaded (1) | 1 | Reduce |
| High (1) | Under loaded (-1) | 1 | Reduce |
| Low(-1) | Over Loaded (1) | 1 | Reduce |
| Low(-1) | Under Loaded (-1) | -1 | Increase |

FIG. 2

GRID-FRIENDLY DATA CENTER

BACKGROUND

Generally, it is readily understood that demand for electrical energy is typically not at all constant, even in a coarsely defined sense, throughout the hours of a typical day. As such, there typically exist certain hours of each day when demand peaks at levels considerably higher than in the remainder of the day.

Generally, if utility companies buy energy during peak demand periods, then they pay a premium for transferring energy when the transmission lines are congested. Flat-rate electric tariffs shield most customers from fluctuations in energy costs, especially those caused by buying energy supplies on short notice. Utilities, however, are not insulated from these fluctuations. When the market rate for electricity rises above the approved retail rate, utilities are "caught in the middle", which can be financially disastrous for them, as typically they are not able to pass price increases along to customers without regulatory approval.

In this general context, peak demand problems are felt particularly acutely among larger-scale customers, e.g., industrial customers, which may draw more power during the day than for an average customer. In other words, peak demand management may well end up affecting such larger-scale customers to a degree that has a direct impact on their ability to conduct business effectively, which itself may affect their own clients or customers. Because of special demands and characteristics brought by data centers in particular, peak demand issues may lead to very significant problems, to debilitating effect, if not properly addressed.

BRIEF SUMMARY

In summary, one aspect of the invention provides a method of calculating a power budget, said method comprising: utilizing at least one processor to execute computer code configured to perform the steps of: receiving data, the data including data relating to a current state of an electrical grid at a power-drawing location which draws at least one variable electrical load, the at least one variable electrical load being subject to variable pricing; determining at least one prediction, the at least one prediction pertaining to a future state of the electrical grid and a future electrical load to be drawn at the power-drawing location; and thereupon calculating a power budget, with respect to the power-drawing location, based on the data and the at least one prediction.

Another aspect of the invention provides an apparatus for calculating a power budget, said apparatus comprising: at least one processor; and a computer readable storage medium having computer readable program code embodied therewith and executable by the at least one processor, the computer readable program code comprising: computer readable program code configured to receive data, the data including data relating to a current state of an electrical grid at a power-drawing location which draws at least one variable electrical load, the at least one variable electrical load being subject to variable pricing; computer readable program code configured to determine at least one prediction, the at least one prediction pertaining to a future state of the electrical grid and a future electrical load to be drawn at the power-drawing location; and computer readable program code configured to thereupon calculate a power budget, with respect to the power-drawing location, based on the data and the at least one prediction.

An additional aspect of the invention provides a computer program product for calculating a power budget, said computer program product comprising: a computer readable storage medium having computer readable program code embodied therewith, the computer readable program code comprising: computer readable program code configured to receive data, the data including data relating to a current state of an electrical grid at a power-drawing location which draws at least one variable electrical load, the at least one variable electrical load being subject to variable pricing; computer readable program code configured to determine at least one prediction, the at least one prediction pertaining to a future state of the electrical grid and a future electrical load to be drawn at the power-drawing location; and computer readable program code configured to thereupon calculate a power budget, with respect to the power-drawing location, based on the data and the at least one prediction.

A further aspect of the invention provides a method comprising: measuring, with respect to a data center, current grid load conditions, current energy pricing and external temperature, the data center including a plurality of computing nodes and a cooling system for cooling the computer nodes; predicting future loads with respect to the data center; determining a correlation between data center loads and grid load conditions; and calculating a future power budget with respect to the data center, based on said measuring, predicting and determining steps.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 sets forth a table with illustrative results for a predictive grid state equation.

DETAILED DESCRIPTION

Figure 1:
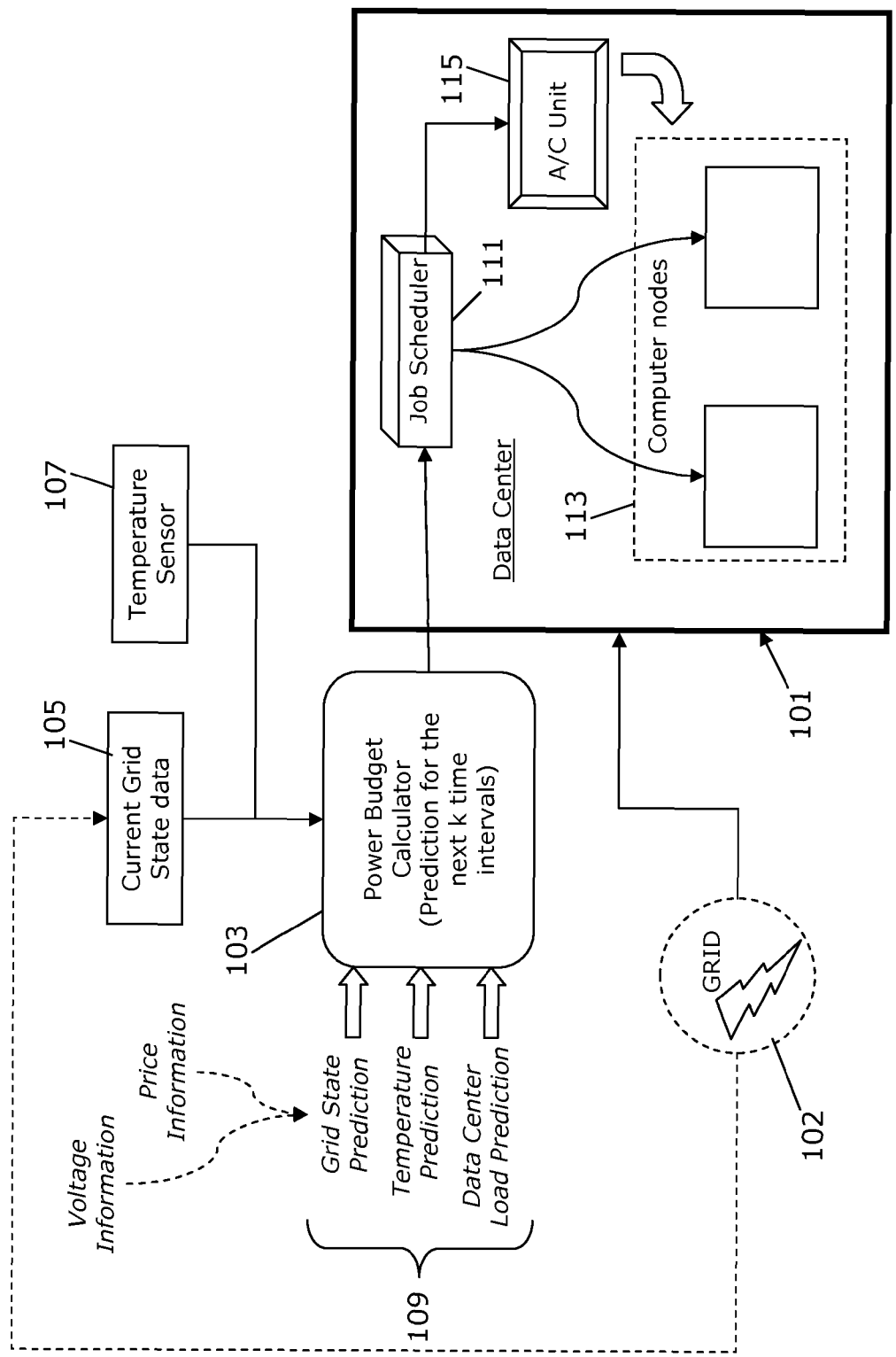
FIG. 1 schematically illustrates a system overview.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, are methods and arrangements for addressing peak demand and other electrical power delivery issues in the context of data centers. Also, methods and arrangements as broadly contemplated herein can be applied to a wide variety of other settings and environments, which may share one or more characteristics of data centers and/or of electrical power delivery arrangements for data centers.

Generally, in accordance with at least one embodiment of the invention, solutions are contemplated herein for a specific class of large-scale customers, particularly those drawing mixed loads such as those found in data centers (i.e., computing and cooling loads). It is also recognized that, in generally addressing problems with respect to peak demand throughout a grid network, there indeed are places where time-of-use or differential pricing is imposed on electricity consumers. Thus, inasmuch as consumers would get direct economic benefit if they reduce consumption during those higher-priced times, help can be provided in that regarded via defining data center consumption for a given day, based on prediction and current information on pricing, grid condition, temperature and the data center's work requirements. (Unless otherwise noted herein, the term "current" is employed in the temporal sense, that is, as an adjective that referring to data, information or other items that are received, read, input or used at a current or present time.)

Generally, electrical load for a data center can be understood as a combination of interactive and batch loads, and are not completely deferrable. Thus, for instance, a technique of completely time-shifting a load from peak to off-peak times would not be suitable for a data center. Other techniques might not take into consideration the grid state (i.e., load on the grid and distribution network) while computing the amount of load that the data center should support at any point in time.

As such, in accordance with at least one embodiment of the invention, it can be appreciated that a data center presents some unique characteristics, e.g., the load of the data center can be variable over time and can be optimally altered without affecting center's performance and efficiency. Also, since data center electricity consumption encompasses two types of load, i.e., IT load and cooling load, and since cooling load is dependent on IT load, it can be recognized that the cooling load—and thus overall electricity consumption—can be optimally governed if IT load itself is governed appropriately.

In accordance with at least one embodiment of the invention, FIG. 1 schematically illustrates a system overview methods and arrangements for arriving at an IT (information technology) power budget of a data center 101 for the next k time intervals. Generally, there are taken into consideration variable pricing (of power from the grid 102), a locally sensed grid state, regular loads offered by the data center and external temperature. More particularly, a power budget calculator 103, which predicts a data center power budget for the next k time intervals, accepts locally sensed data relating to the state of the electrical grid (105) as well as external temperature data (107) (inasmuch as this might affect the degree to which air conditioning [A/C] needs to be employed with respect to the data center). Predictive inputs 109 include future grid state prediction, temperature prediction and data center load prediction. Future grid state prediction is based on current voltage information and/or pricing information. The power budget calculator 103 connects with a job scheduler 111 in data center 101, which then governs the scheduling of jobs with respect to computer nodes 113, as well as operation of an associated air conditioning system 115 which serves to cool at least the nodes 113.

By way of an algorithm, in accordance with at least one embodiment of the invention, the grid state gs(t) is calculated for the next k time steps via combining pricing, locally sensed grid state and user preference for price sensitivity. Given the base critical load and total load requirement from the data center, variable data center load v(t) is also calculated for the next k time steps. A correlation is found between grid state and data center load, ρ. A total "grid-friendly" power budget pb(t) relative to an entire IT enterprise (or concern), which includes hardware and other components related to a data center but also other electrically-powered components which may or may not be directly related to the data center components, is calculated based on correlation ρ, grid state gs(t), data center load requirements and user preferences relating to grid friendliness. A grid-friendly IT (data center) power budget ipb(t) is calculated based on total grid friendly power budget pb(t) and predicted cooling load requirement, based on external temperature; thus, power allocation to the A/C unit(s) is considered to be part of the IT power budget.

To predictively calculate grid state gs(t) for the next k time steps, in accordance with at least one embodiment of the invention, two functions are first obtained: p(t), a pricing function and g(t), a grid state function. These may be obtained from historical, locally sensed data and/or from the utility company. A psi (power sensitivity index) value, between 0 and 1, is also obtained (e.g., from data center management). Using the psi value, p(t) and g(t) are scaled, wherein p(t) is multiplied by psi and g(t) is multiplied by (1-psi). This provides an approximate weighting for pricing value and grid state value. The maximum value of either scaled value (psi*p(t) or (1-psi)*g(t)) is obtained. Depending on which value is higher at any point in time, choose the appropriate non-scaled value, p(t) or g(t), as the indicator of grid state.

Accordingly, in accordance with at least one embodiment of the invention, it can be appreciated that the grid state 105 represents a contributing factor for altering the load offered by the data center. The grid state 105, for its part, depends on a global price signal (e.g., any current or future differential price information, as a general data input) and a locally sensed grid load signal; such local sensing can be undertaken essentially in any suitable manner, including via a "smart plug" which may be able to locally sense/determine the state of a power grid with respect to a component, appliance or set of these. The price sensitivity index (psi) lends a weighting to the pricing signal and the load signal. The price and grid load are then estimated, and used to compute the grid state gs(t) for the next k time steps. Accordingly, upon weighting, p(t) and g(t) are each normalized in the range from -1 to +1, and gs(t) is calculated as follows:

$$gs(t) = \begin{cases} p(t), & \text{if } psi^*p(t) > (1-psi)*(g(t)), \\ g(t), & \text{otherwise,} \end{cases}$$

$\forall t \in k$, and wherein gs(t) is in the range between (including) -1 and +1

FIG. 2 sets forth a table, by way of illustrative example, where maximum and minimum values of p(t) and g(t) are shown as inputs in combination, with values of gs(t) that result (along with a general guideline for action to be taken accordingly, i.e., "reduce" or "increase" data center power consumption).

In accordance with at least one embodiment of the invention, variable and total data center loads v(t) and L(t), respectively, are computed for the next k time steps. To this end, there is determined the time when the grid is loaded. The total expected load in the data center is then obtained for the next k time intervals, as are the values of the total expected load in the data center only for those time instances in which gs(t) was greater than 0 (when the grid is overloaded). A correlation coefficient ρ (-1 to 1) between the two graphs is found, between the total expected load in the data center and the total grid state whenever the grid is loaded, and ρ is then scaled to be between 0 and 1.

More particularly, in accordance with at least one embodiment of the invention, it can be recognized that the load offered by a data center (in kWh) includes IT loads and cooling (air conditioning) loads. Thus, i(t) represents the IT load, or the total IT load that the data center is requesting. Also, let b(t) represent a base critical component of i(t), that is, a minimum IT load requirement that cannot be reduced. c(x, y) is a function which outputs the cooling load in kWh when the IT load is x and the external temperature near the air conditioning units is y. It can either be a simple function of the IT load and external temperature, or it can take into consideration the airflow of the data center, the distribution of the servers in the data center etc. Accordingly, using b(t), i(t) and an external temperature forecast T(t), the variable v(t) and total loads L(t) of the data center for the next k time steps are computed as:

$$v(t)=i(t)-b(t)+c(i(t)T(t))-c(b(t),T(t)), \forall t \in k$$

$$L(t)=i(t)+c(i(t),T(t)), \forall t \in k$$

In accordance with at least one embodiment of the invention, correlation ρ between grid state and data center load is determined as follows. The total data center load and base critical load from the data center are obtained, while the variable part of the data center load is obtained by subtracting the total requested load from the base critical load. The grid sensitivity index is obtained from the data center management, reflecting how much the data center should vary its variable load to be grid friendly. Also determined is the total load pb(t) that the data center should support by multiplying the variable part of the load with gsi, grid state and scaled correlation coefficient.

As such, in accordance with at least one embodiment of the invention, it can be appreciated that data center would be very "grid friendly" if grid load and data center load are negatively correlated; thus, the data center load is preferably not altered significantly if there is a good negative correlation during grid peak demand. As such, ρ is used to appropriately compute a new power budget, and is computed between the time series gs(t) and L(t) for the next k time steps:

$$\rho=CORR(gs(t),L(t)) \forall t \in k:gs(t)>0$$

This provides the degree of negative influence the data center load has on the grid when the grid is overloaded, and yields a value between -1 and 1. ρ1=(ρ+1)/2, to rescale the correlation coefficient to fall between 0 and 1.

In accordance with at least one embodiment of the invention, a total grid-friendly power budget pb(t) is determined for the next k time steps. This is accomplished at least by obtaining a temperature prediction for the next k time instances, and finding the maximum IT load ipt(t) that the data center can support given the external temperature.

As such, in accordance with at least one embodiment of the invention, the new total power budget of the data center, for the next k time steps, is computed using the correlation and grid state so that the data center could be grid friendly by altering its variable load. Accordingly, $$pb(t)=L(t)-(\rho 1^*gs(t)^*gsi^*v(t)), \forall t \in k.$$

The power budget is then increased or decreased in accordance with the grid state and correlation ρ.

Figure 3:
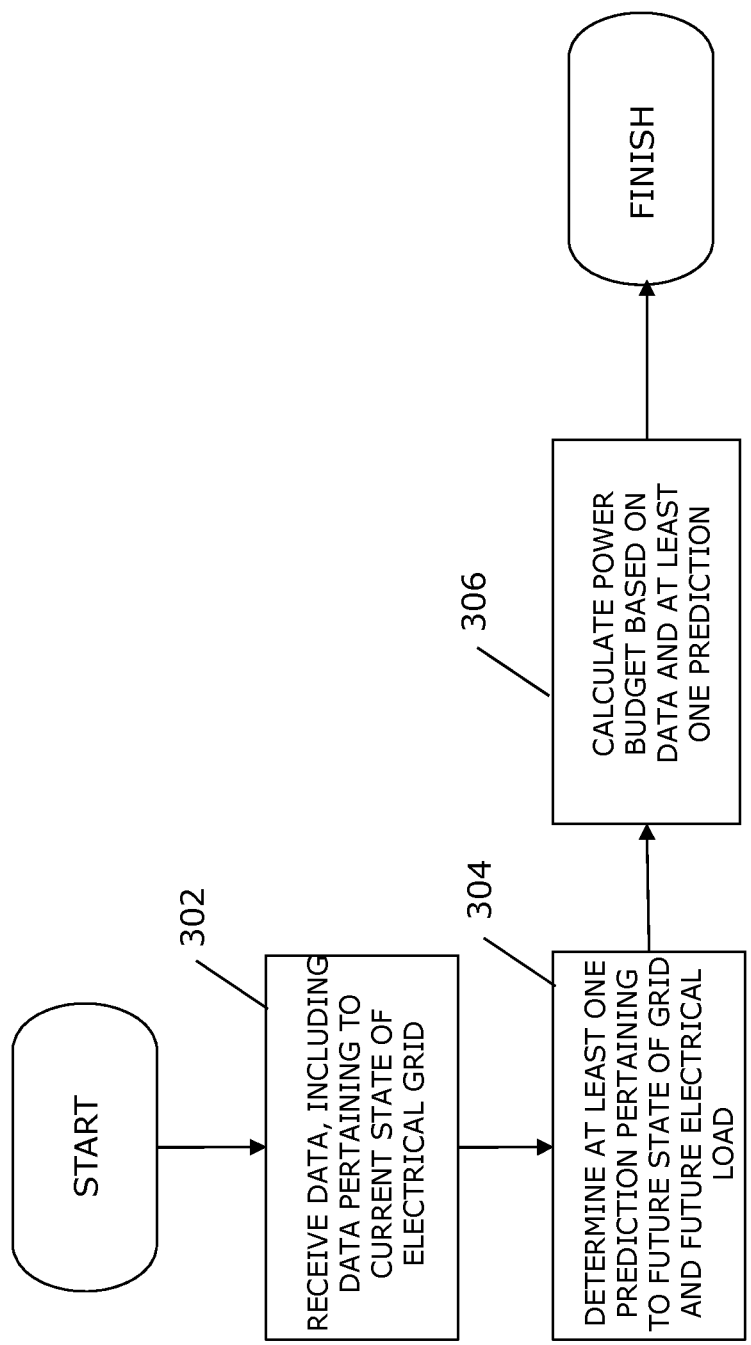
FIG. 3 sets forth a process more generally for calculating a power budget.

Further, in accordance with at least one embodiment of the invention, a grid-friendly IT (only) power budget ipb(t) is determined for the next k time steps. Here, in other words, there is determined the maximum IT load that the data center can offer without exceeding the total power budget pb(t)

while considering the cooling requirement c(ipb(t),T(t)) for the predicted external temperature T(t). Thus:

maximize $ipb(t)$ such that $pb(t) \geq ipb(t) + c(ipb(t), T(t)) \forall t \in k$ FIG. 3 sets forth a process more generally for calculating a power budget, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, data are received, the data including data relating to a current state of an electrical grid at a power-drawing location which draws at least one variable electrical load, the at least one variable electrical load being subject to variable pricing (302). At least one prediction is determined, the at least one prediction pertaining to a future state of the electrical grid and a future electrical load to be drawn at the power-drawing location (304). A power budget is thereupon calculated, with respect to the power-drawing location, based on the data and the at least one prediction (306).

Figure 4:
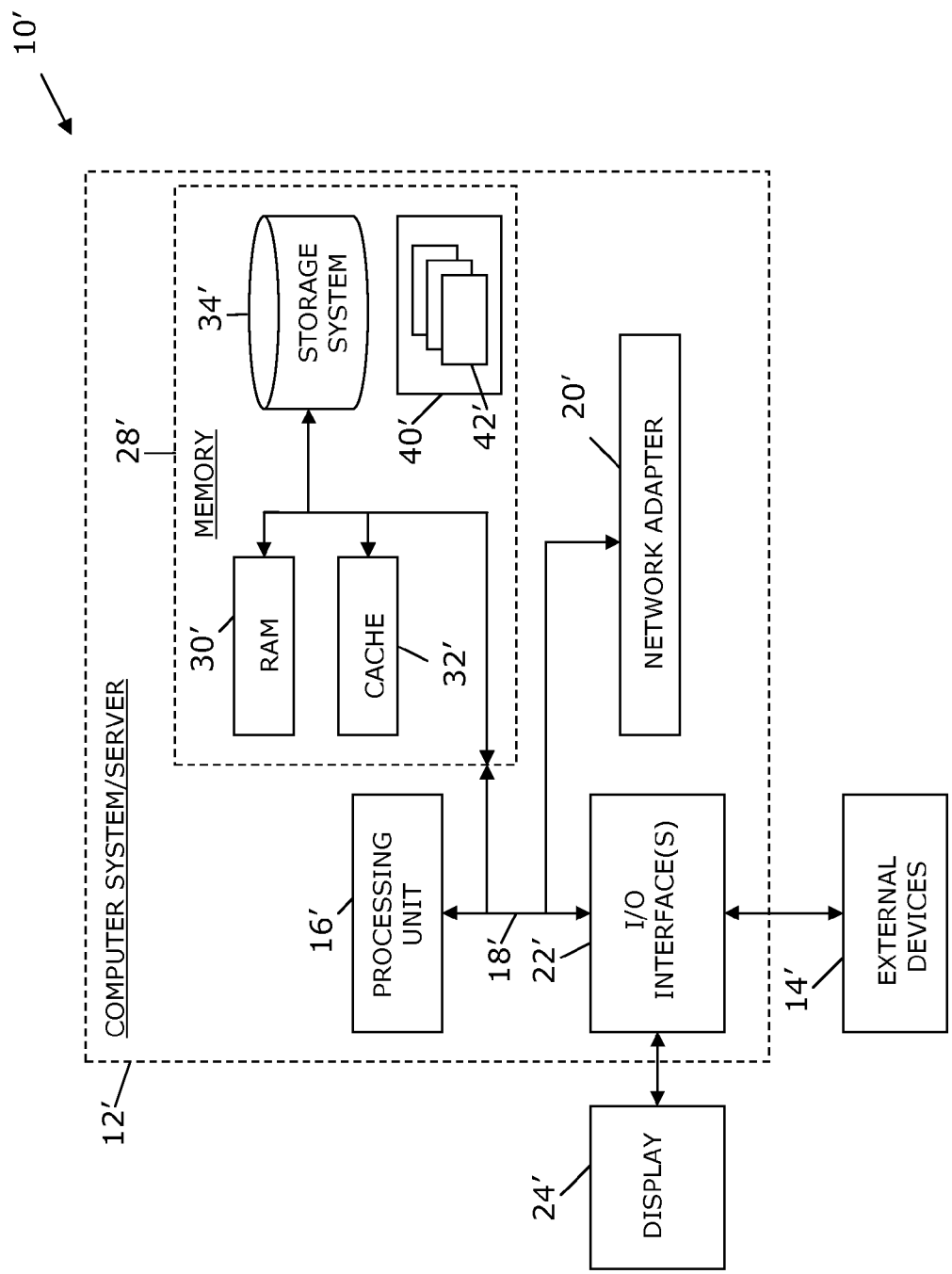
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/ server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of calculating a power budget, said method comprising:
   utilizing at least one processor to execute computer code configured to perform the steps of:
   receiving data, the data including data relating to a current state of an electrical grid at a power-drawing location which draws at least one variable electrical load, the at least one variable electrical load being subject to variable pricing;
   determining at least one prediction relating to a future state of the electrical grid over a predetermined future time period, wherein the determining comprises identifying an estimated pricing function for the predetermined future time period, an estimated grid state function for the predetermined future time period, and a power sensitivity index value;

the determining comprising weighting the estimated pricing function and the estimated grid state function based on the power sensitivity index value and identifying the function having a higher weighted value and selecting, from the estimated pricing function and the estimated grid state function, a value, corresponding to the function having the higher weighted value, for the future state of the electrical grid;

identifying, based upon the predicted future state of the electrical grid, a time period from the predetermined future time period corresponding to an overload of the electrical grid, wherein the identifying comprises identifying a value for the overload that is greater than a predetermined value;

determining a future electrical load to be drawn at the power-drawing location for the time period from the predetermined future time period, wherein the future electrical load comprises a variable electrical load and a base electrical load at the power-drawing location;

identifying a correlation between the predicted future state of the electrical grid and the future electrical load, wherein the correlation identifies a degree of influence of the future electrical load to the predicted future state of the electrical grid; and thereupon calculating a power budget, with respect to the power-drawing location, based on the correlation.

2. The method according to claim 1, wherein the power-drawing location comprises a data center.

3. The method according to claim 2, wherein the power drawing location comprises an air-conditioning system which cools the data center.

4. The method according to claim 1, wherein the data additionally include data relating to external temperatures at the power-drawing location.

5. The method according to claim 1, wherein the at least one prediction additionally relates to future external temperatures at the power-drawing location.

6. The method according to claim 1, wherein said determining of at least one prediction comprises predicting a future state of the electrical grid via receiving at least one of: current voltage information, and current pricing information.

7. The method according to claim 6, wherein said determining of at least one prediction comprises predicting a future state of the electrical grid via receiving both of: current voltage information, and current pricing information.

8. The method according to claim 1, wherein the power-drawing location comprises a location which draws non-deferrable electrical loads.

9. The method according to claim 8, wherein the power-drawing location comprises a data center.

10. An apparatus for calculating a power budget, said apparatus comprising:
at least one processor; and
a computer readable storage medium having computer readable program code embodied therewith and executable by the at least one processor, the computer readable program code comprising:
computer readable program code configured to receive data, the data including data relating to a current state of an electrical grid at a power-drawing location which draws at least one variable electrical load, the at least one variable electrical load being subject to variable pricing;
computer readable program code configured to determine at least one prediction relating to a future state of the electrical grid over a predetermined future time period, wherein the determining comprises identifying an estimated pricing function for the predetermined future time period, an estimated grid state function for the predetermined future time period, and a power sensitivity index value;
the determining comprising weighting the estimated pricing function and the estimated grid state function based on the power sensitivity index value and identifying the function having a higher weighted value and selecting, from the estimated pricing function and the estimated grid state function, a value, corresponding to the function having the higher weighted value, for the future state of the electrical grid;
computer readable program code configured to identify, based upon the predicted future state of the electrical grid, a time period from the predetermined future time period corresponding to an overload of the electrical grid, wherein the identifying comprises identifying a value for the overload that is greater than a predetermined value;
computer readable program code configured to determine a future electrical load to be drawn at the power-drawing location for the time period from the predetermined future time period, wherein the future electrical load comprises a variable electrical load and a base electrical load at the power-drawing location;
computer readable program code to identify a correlation between the predicted future state of the electrical grid and the future electrical load, wherein the correlation identifies a degree of influence of the future electrical load to the predicted future state of the electrical grid; and
computer readable program code configured to thereupon calculate a power budget, with respect to the power-drawing location, based on the correlation.

11. A computer program product for calculating a power budget, said computer program product comprising:
a non-transitory computer readable storage medium having computer readable program code embodied therewith, the computer readable program code comprising:
computer readable program code configured to receive data, the data including data relating to a current state of an electrical grid at a power-drawing location which draws at least one variable electrical load, the at least one variable electrical load being subject to variable pricing;
computer readable program code configured to determine at least one prediction relating to a future state of the electrical grid over a predetermined future time period, wherein the determining comprises identifying an estimated pricing function for the predetermined future time period, an estimated grid state function for the predetermined future time period, and a power sensitivity index value;
the determining comprising weighting the estimated pricing function and the estimated grid state function based on the power sensitivity index value and identifying the function having a higher weighted value and selecting, from the estimated pricing function and the estimated grid state function, a value, corresponding to the function having the higher weighted value, for the future state of the electrical grid;
computer readable program code configured to identify, based upon the predicted future state of the electrical grid, a time period from the predetermined future time period corresponding to an overload of the electrical arid, wherein the identifying comprises identifying a value for the overload that is greater than a predetermined value;
computer readable program code configured to determine a future electrical load to be drawn at the power-drawing location for the time period from the predetermined future time period, wherein the future electrical load comprises a variable electrical load and a base electrical load at the power-drawing location;
computer readable program code to identify a correlation between the predicted future state of the electrical grid and the future electrical load, wherein the correlation identifies a degree of influence of the future electrical load to the predicted future state of the electrical grid; and
computer readable program code configured to thereupon calculate a power budget, with respect to the power-drawing location, based on the correlation.

12. The computer program product according to claim 11, wherein the power-drawing location comprises a data center.

13. The computer program product according to claim 12, wherein the power-drawing location comprises an air-conditioning system which cools the data center.

14. The computer program product according to claim 11, wherein the data additionally include data relating to external temperatures at the power-drawing location.

15. The computer program product according to claim 11, wherein the at least one prediction additionally relates to future external temperatures at the power-drawing location.

16. The computer program product according to claim 15, wherein said computer readable program code is configured to predict a future state of the electrical grid via receiving at least one of: current voltage information, and current pricing information.

17. The computer program product according to claim 16, wherein said computer readable program code is configured to predict a future state of the electrical grid via receiving both of current voltage information, and current pricing information.

18. The computer program product according to claim 11, wherein the power-drawing location comprises a location which draws non-deferrable electrical loads.

19. The computer program product according to claim 18, wherein the power-drawing location comprises a data center.

20. A method comprising:
measuring, with respect to a data center, current grid load conditions, current energy pricing and external temperature, the data center including a plurality of computing nodes and a cooling system for cooling the computer nodes;
predicting future loads for a predetermined future time period with respect to the data center, wherein the future loads comprise a variable electrical load and a base electrical load at the data center;
predicting future grid load conditions for the predetermined future time period, wherein the future grid load conditions comprise an estimated future pricing function, an estimated grid state function, and a power sensitivity index value;
the predicting future grid load conditions comprising weighting the estimated future pricing function and the estimated grid state function based on the power sensitivity index value and identifying the function having a higher weighted value and selecting, from the estimated future pricing function and the estimated grid state function, a value, corresponding to the function having the higher weighted value, for a predicted future state of the electrical grid;
identifying, based upon the predicted future state of the electrical grid, a time period from the predetermined future time period corresponding to an overload of the electrical grid, wherein the identifying comprises identifying a value for the overload that is greater than a predetermined value;
determining, for the time period from the predetermined future time period, a correlation between the predicted future loads and the predicted future state of the electrical grid, wherein the correlation identifies a degree of influence of the predicted future loads to the predicted future state of the electrical grid; and
calculating a future power budget with respect to the data center, based on said correlation.

* * * * *